Jan. 5, 1960     I. W. CONRAD     2,920,185

VEHICULAR EMERGENCY LIGHTING SYSTEM

Filed April 29, 1957

IVAN W. CONRAD
INVENTOR.

BY

*John B. Brady*
ATTORNEY

2,920,185
VEHICULAR EMERGENCY LIGHTING SYSTEM

Ivan W. Conrad, Alexandria, Va.

Application April 29, 1957, Serial No. 655,825

8 Claims. (Cl. 240—7.1)

The present invention relates to vehicular lighting systems and more particularly to light assemblies which may be used for temporary lighting purposes or for emergency warning purposes.

In the past there have been proposed various light accessories to accomplish certain of these purposes, such as a permanently mounted clear spot light for temporary or emergency lighting; or a permanently mounted red or blue emergency warning light such as frequently seen permanently mounted on the top of a police car. However, the permanent nature of these lights has the undesirable result of disfiguring the car, and the further undesirable result, for certain types of law enforcement work, of making the car readily recognizable as a police car. In addition, the permanently mounted clear spotlights in general are restricted in the solid angle which they can illuminate.

Accordingly, a major objective of the present invention is to provide an emergency warning light which may be completely concealed within the car or other vehicle until such time as it is needed, at which latter time the light may be quickly mounted on the car to serve its warning function. This feature makes it possible, where desired in surveillance, detective, or other police work, to conceal the nature of the vehicle, until such time as hot pursuit or other emergency may require use of the warning light, as for example to secure emergency right-of-way.

Another important objective is to provide a vehicular emergency light the mounting of which will not require disfiguring or marring the vehicle's external appearance or finish.

Another important objective is to provide an emergency light which, if desired, may be used not only to serve the normal functions of permanently mounted emergency lights, but may also be quickly and readily available as a hand-carried lantern for use in the vicinity of the vehicle.

With the foregoing general objects in view the invention consists in the novel combinations and arrangements of features as will be hereinafter more fully described, illustrated in the accompanying drawings and defined in the appended claims.

In the accompanying drawings, wherein are illustrated different practical embodiments of the invention and wherein like characters of reference denote corresponding parts in related views.

Figure 1:
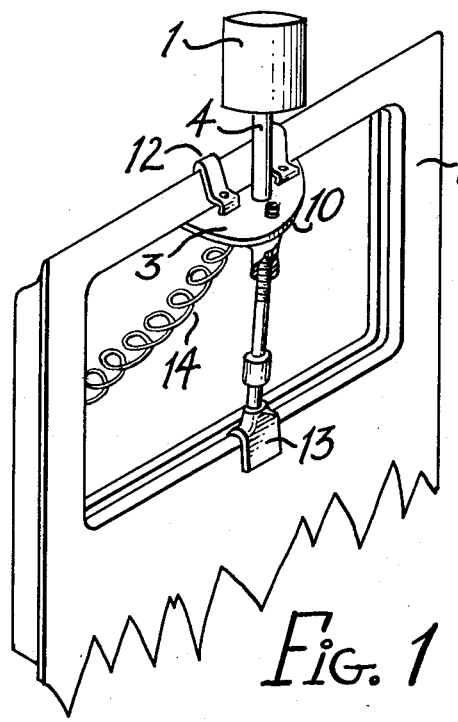
Fig. 1 is a diagrammatic view illustrating the general principle of the invention.

Referring to the drawings in detail, 1 designates generally a light source, 2 designates generally a vehicle window frame and 3 designates generally a readily removable bracket including extension column 4 for mounting light source 1 on vehicle component 2.

In Fig. 1 the mounting bracket 3 consists of a base plate 10, an edge or rib 11 of which is designed to rest in the top window channel of frame 2. This base plate 10 is supported against the top window channel by adjustable clamps 12 which hook over the top edge of window frame 2, and by adjustable extension clamp 13 which hooks over the bottom edge of window frame 2. Although both clamps 12 and 13 are shown, it is pointed out that base plate 10 may alternatively be secured to frame 2 by either clamps 12 alone or by clamp 13 alone. Light source 1 is, in turn, mounted on base plate 10 by means of mechanical extension column 4 and may derive its power either from self-contained batteries, or alternatively from the vehicular electrical system through suitable flexible wire connection 14, which may, for example, plug into vehicular cigarette lighter or other suitable connector.

Figure 2:
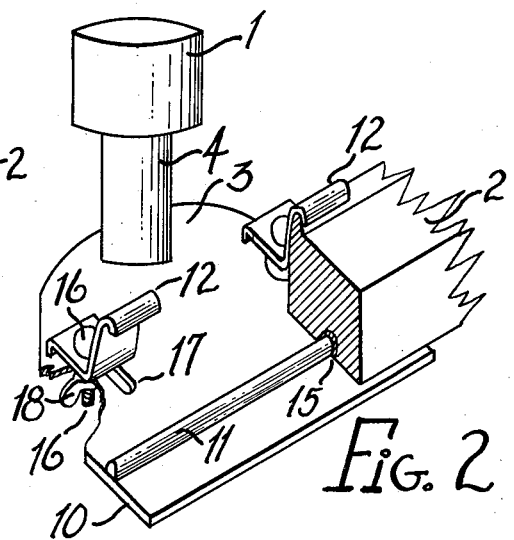
Fig. 2 is a detailed oblique view illustrating one embodiment of a mounting bracket assembly, suitable for use in the system of Fig. 1.

Referring to Fig. 2 there is shown in detail a mounting bracket 3 suitable for use in the system of Fig. 1. Base plate 10 in this embodiment is shown fitted only with clamps 12 although, as stated above, clamp 13 of Fig. 1 may also be added if desired. A raised edge or rib 11 is provided to rest in window channel 15 of frame 2, shown in cut-away view. Clamps 12 are coated with bonded rubber on surfaces coming into contact with frame 2 in order to avoid damage to car finish. Clamps 12 are adjustably fastened to base plate 10 by means of threaded bolts 16 extending through slotted openings 17 and held by wingnuts 18. Bolts 16 are of such length that in actual use, wingnuts 18 may be loosened sufficiently to permit disengagement of clamps 12 from frame 2 without wingnuts 18 being removed from bolts 16. Entire light, bracket, and clamp assembly may thus be readily released from frame 2. Light source 1 is mounted on base plate 10 by mechanical extension 4. Installation or removal of entire light and bracket assembly can be accomplished from within the vehicle through the opened window.

Figure 3:
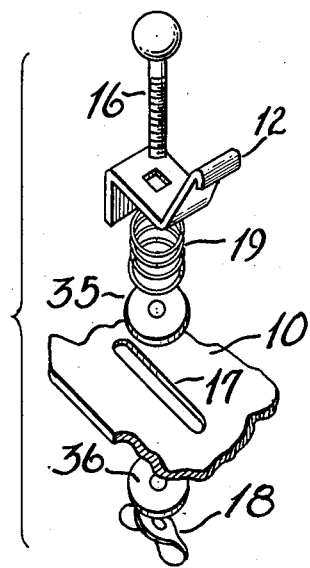
Fig. 3 is a detailed view illustrating one embodiment of clamp assembly suitable for use as part of the mounting bracket shown in Fig. 2.

In Fig. 3 is shown exploded detail of clamp 12 of Figs. 1 and 2. In manufacture, the head of bolt 16 is welded to clamp 12 during assembly, and clamp 12 is then adjustably fastened to baseplate 10 by means of compression spring 19, washers 35 and 36, and wingnuts 18, with bolt 16 extending through slotted opening 17 of plate 10, the order of assembly being as shown in Fig. 3.

Figure 4:
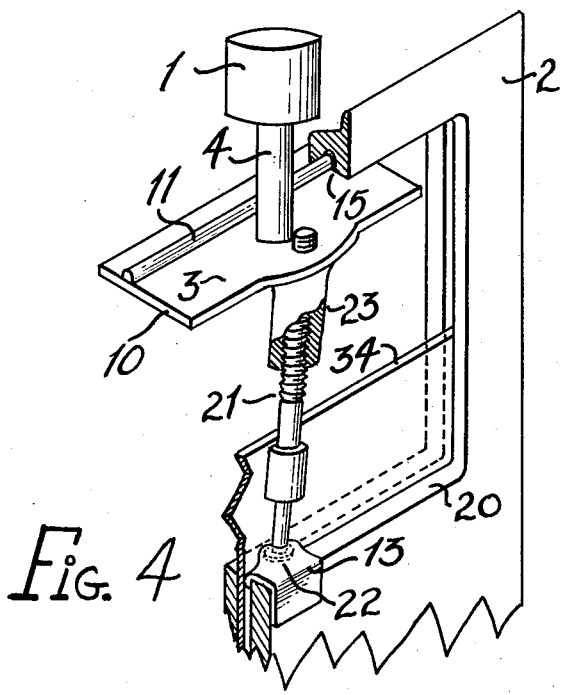
Fig. 4 is a detailed view of an alternative embodiment of mounting bracket assembly suitable for use in the system of Fig. 1.

In Fig. 4 is shown detailed cut-away view of an alternative mounting bracket 3 suitable for use in the system of Fig. 1. Base plate 10 in this embodiment is shown fitted with clamp 13 only, although as stated above, clamps 12 of Figs. 2 and 3 may be added if desired, as shown in Fig. 1. Rib 11 again is provided to rest in top window channel 15 of frame 2, and light source 1 is fastened to baseplate 10 by mechanical column 4. Vehicle contact areas of clamp 13 are rubber coated to protect vehicle finish. Clamp 13 resting against bottom window frame edge 20 and alongside window glass 34, includes rotatable threaded member 21, one end of which terminates in axial thrust bearing 22 and the other end of which engages threaded boss 23 of plate 10. Accordingly rotation of member 21 in one direction will serve to engage rib 11 firmly in window channel 15, whereas, rotation in the opposite direction will serve to shorten the distance between plate 10 and bottom end of clamp 13, thus permitting entire lamp, bracket, and clamp assembly to be disengaged from window frame and removed from car. Installation or disengagement may be accomplished from within the vehicle by rolling down the window to permit necessary access.

While the light source 1 in Figs. 1 through 4 has been indicated in general terms only, it will be apparent to those skilled in the art that said light source 1 may take on a variety of forms without departing from the scope and intent of the present invention. Representative, but non-limiting examples of such sources include for instance the well known emergency-rotating-flasher type, now commonly used for permanent mounting on the roof of police vehicles, for dispersing a flashing light over a 360 degree arc in a horizontal plane; or alternatively, source 1 may consist of a so-called sealed beam type, adjustable as to orientation in both vertical and horizontal planes, such adjustment of orientation being operable from within the vehicle, if desired, through suitable, well known mechanical linkage of the type now in common use for permanently mounted adjustable spotlights on automobiles.

It will be obvious that by means of the present invention, an occupant of a vehicle may carry completely concealed within the vehicle an emergency or warning light of the type disclosed, and further, that without stopping or leaving the vehicle, the occupant may, when desired, attach said light to said vehicle in the manner disclosed so that the performance of the installed light is substantially equal in respect to emergency illumination or warning functions to lights which are currently installed on a permanent basis for such purposes. Although this has been a desired objective for many years, it has not been possible prior to present invention. An essential element has been the necessity to have the emergency warning light at or above the roof level of the vehicle.

It will further be apparent that by means of the present invention, the emergency light may be readily detached from the vehicle, and may be hand carried in the vicinity of the vehicle for special illumination or warning applications.

While only certain specific embodiments of the invention have been illustrated and described to convey the general conception of the invention, it is to be understood that the same is readily capable of various other embodiments within its spirit and scope as defined in the appended claims.

What I claim as new and desire to secure by Letters Patent of the United States is:

1. An emergency vehicular light assembly for attaching to a vehicle having a door provided with a window opening and an upper window-receiving channel therein, said assembly comprising a base plate, a raised ridge on the upper surface of said plate for engaging an upper window-receiving channel of the vehicle door, adjustable clamps for engaging top edge of said door whereby said ridge is held firmly in said window channel, an additional adjustable clamp for engaging bottom edge of window opening of said door and providing upward thrust whereby base plate is forced firmly against top edge of said window opening, a projecting column extending from said base plate to roof level of said vehicle, and a light source mounted on top of said column.

2. An emergency vehicular light assembly for attaching to a vehicle having a door provided with an upper window-receiving channel, said assembly comprising a base plate, a raised ridge on the upper surface of said plate for pressingly engaging said channel of the vehicle door, an adjustable manually operable clamp secured to said base plate for engaging the top edge of said door whereby said ridge is held firmly in said window-receiving channel, a projecting member extending from said base plate substantially to roof level of said vehicle, and a light source mounted on top of said member.

3. An emergency vehicular light assembly for attaching to a vehicle having a door provided with a window opening and an upper window-receiving channel therein, said assembly comprising a base plate, a raised ridge on the upper surface of said plate for pressingly engaging said channel of the vehicle door, an adjustable manually operable clamp secured at one end to said plate and its other end engaging the bottom edge of said opening and said clamp providing an upward thrust whereby said base plate is forced firmly against the top edge of said window opening, a projecting member extending from said base plate substantially to roof level of said vehicle, and a light source mounted on top of said member, said raised ridge providing the principal means of preventing relative motion between said base plate and said channel in either direction normal to the plane of said door.

4. An emergency lighting system as set forth in claim 1 in which the said light source derives its power from said vehicle through a flexible extension cord, whereby said light may when removed from said door be manually supported and directed in the vicinity of said vehicle.

5. An emergency vehicular light assembly for installation on a vehicle door having an upper window-receiving channel, said assembly comprising a substantially flat base plate, a substantially straight lineally extending ridge formed on the upper surface of said plate for engaging said channel, said plate being provided with a hole centered on a line substantially parallel to said ridge, a clamp member having a fulcrum at one end in contact with said base plate and having a hook at the opposite end for hooking over the edge of said vehicle door, said clamp member being further fitted with a threaded member engaging a mating threaded member through said hole whereby through manual operation of said threaded members said base plate may be firmly locked to said vehicle door, and a light source mounted on said base plate.

6. An emergency vehicular light assembly for installation on a vehicle window frame having a window-receiving channel, said assembly comprising a substantially flat base plate, a raised linear ridge formed on the upper surface of said plate for engaging an upper window-receiving channel of said window frame in two separated points, said ridge forming the principal member preventing motion of said base plate in either direction normal to the plane of said window frame, a clamping member formed to hook over the bottom edge of said window frame into the bottom window-receiving channel, a threaded thrust member linking said clamp member with said base plate whereby through manual operation of said threaded thrust member said base plate ridge may be firmly locked in said upper window-receiving channel, and a light source mounted on said base plate.

7. An emergency lighting system as set forth in claim 1 in which said adjustable clamps for engaging the top edge of said vehicle door and said adjustable clamp for engaging the bottom edge of said window opening are each detachably secured to said base plate.

8. An emergency vehicular light assembly for installation on a vehicle door having an upper window-receiving channel, said assembly comprising a substantially flat base plate, a linear ridge formed on the upper surface of said plate for engaging said channel, said plate being provided with a plurality of holes centered on a line substantially parallel to said ridge, a plurality of clamp members each having a fulcrum at one end in contact with said plate and each having a hook at the opposite end for hooking over the top edge of said vehicle door, said clamp members each being further equipped with a threaded member engaging a corresponding mating threaded member through a corresponding one of said holes whereby through manual operation of said threaded members said base plate may be firmly secured to said vehicle door, and a light source mounted on said base plate.

References Cited in the file of this patent

UNITED STATES PATENTS

| Number | Name | Date |
|---|---|---|
| 1,620,045 | Torbert | Mar. 8, 1927 |
| 1,688,148 | Martin | Oct. 16, 1928 |
| 2,294,040 | Metcalf | Aug. 25, 1942 |
| 2,510,175 | Hess | June 6, 1950 |
| 2,753,439 | Greenfield | July 3, 1956 |
| 2,783,367 | Locke | Feb. 26, 1957 |